Dec. 7, 1965 W. W. DAVIS 3,222,645

MAGNETIC PARALLEL COMPARISON MEANS FOR COMPARING A TEST WORD WITH A PLURALITY OF STORED WORDS

Filed Oct. 17, 1962 2 Sheets-Sheet 1

INVENTOR
WILLIAM W. DAVIS
BY [signature]
ATTORNEY

Dec. 7, 1965 W. W. DAVIS 3,222,645

MAGNETIC PARALLEL COMPARISON MEANS FOR COMPARING
A TEST WORD WITH A PLURALITY OF STORED WORDS

Filed Oct. 17, 1962 2 Sheets-Sheet 2

INVENTOR
WILLIAM W. DAVIS
BY Herbert [signature]
ATTORNEY

United States Patent Office 3,222,645

Patented Dec. 7, 1965

3,222,645

MAGNETIC PARALLEL COMPARISON MEANS FOR COMPARING A TEST WORD WITH A PLURALITY OF STORED WORDS

William W. Davis, Minneapolis, Minn., assignor to Sperry Rand Corporation, New York, N.Y., a corporation of Delaware Filed Oct. 17, 1962, Ser. No. 231,172
27 Claims. (Cl. 340—146.2)

This invention relates in general to a decoding device and in particular such a device that compares a test word of a known binary digit, or bit, order to a plurality of stored, different, fixed-bit-order words. The comparison, upon a finding of an equality of a test word with a stored word, provides an output signal indicative of the found stored word.

Ordinary magnetic cores and circuits utilized in magnetic logic systems are now so well known that they need no special description herein. However, for purposes of the present invention, it should be understood that such magnetic cores are capable of being magnetized to saturation in either of two directions. Furthermore, these cores are formed of magnetic material which is selected to have at least two stable remanent magnetic states which assures that after they have been saturated in either direction and the drive field has been removed, a definite point of magnetic remanence representing the residual flux density in the core will be retained. The residual flux density representing the point of magnetic remanence in a core possessing such characteristics is preferably of substantially the same magnitude as that of its maximum saturation flux density. These magnetic core elements are usually connected in circuits providing one or more input coils for purposes of switching the core from one magnetic state corresponding to a particular direction of saturation, i.e., positive saturation denoting a binary "1" to the other magnetic state corresponding to the opposite directional saturation, i.e., negative saturation denoting a binary "0". One or more output coils are usually provided to sense when the core switches from one state of saturation to the other. Switching of the core can be achieved by passing a drive signal of a sufficient amplitude-duration characteristic through the input windings in a manner so as to set up a magnetic field in the area of the magnetic core in the sense opposite to the pre-existing flux direction, thereby driving the core to saturation in the opposite direction of polarity, i.e., of positive to negative saturation. When the core switches, the resulting magnetic field variation induces a signal in the other windings on the core such as, for example, the above mentioned output sense winding. The amplitude or polarity of the output signal identifies the storage state as having been "1" or "0". Alternatively, the cores utilized in this invention may be thin ferromagnetic films such as formed by the process disclosed and claimed in Patent No. 2,900,282 granted to S. M. Rubens, and assigned to the assignee of this application. The term "thin ferromagnetic film" shall refer to magnetic cores of the thin film type which have single domain properties and thus provides substantially coherent rotational switching. As regards this application, the term "single domain properties" may be considered the characteristic of a three dimensional element of magnetic material having a thin dimension which is substantially less than the width and length thereof wherein no domain walls can exist parallel to the large surface of the element. Such thin ferromagnetic films preferably possess the property of uniaxial anisotropy so as to have a preferred or easy axis of remanent magnetization. The use of such thin ferromagnetic films in single element circuits and in multi-element circuits such as logic arrays, is disclosed in the A. Frank et al. publication entitled Deposited Magnetic Flms as Logic Elements, 1959 Proceedings of the Eastern Joint Computer Conference, pages 28–37.

The preferred embodiment of an apparatus incorporating applicant's novel idea consists of a plurality of bistable magnetic cores arranged in a matrix array of rows and columns with the bits of each row forming a word, and with similarly located bits of each word forming a column. A test word register containing the test word has each stage thereof coupled only to the bit-cores of each associated column by a column line which is coupled to said bit-cores in a first magnetic sense. The test word register couples to said column lines bipolar information current pulses whose polarity is indicative of the information stored therein, i.e., a positive pulse is indicative of a stored "1" and a negative pulse is indicative of a stored "0". Additionally, all the bit-cores of each word are coupled by a set line and an output line, both lines coupled to said bit-cores in the same first or second magnetic sense as determined by the information stored therein, i.e., in a first magnetic sense indicative of a stored "1" and a second and opposite magnetic sense indicative of a stored "0".

Initially, all the bit-cores of the array are set by a set pulse which is coupled to the set line which set pulse sets the bit-cores in the appropriate magnetic states as determined by the winding sense of the set line to the associated bit-cores. Next, the information pulses indicative of the information stored in the test word register, are simultaneously coupled to the associated column lines. These information pulses set up magnetic fields which switch the magnetic states of those bit-cores whose initial magnetic states are of an opposite magnetic sense to that of the fields set up by the coupled information pulses. However, it is to be appreciated that the operation of the bit-cores in the reverse order, i.e., initially coupling the information pulses indicative of the test word to the bit-cores then coupling the set pulse to the bit-core set line, will perform the same function. Switching of the magnetic state of any bit-core—which switching is indicative of the mismatch of the bit of the test word and the bit of the stored word—produces an output pulse in a coupled word output line.

The output line of each word is coupled to a separate negation-core which is preset to a first magnetic state which state is opposite to the magnetic state induced in said negation-core by the word line output pulse. Consequently, the output pulse resets its associated negation-core to a second and opposite magnetic state. Subsequently, a clear pulse of the same magnetic sense as the output pulse is coupled to all the negation-cores which, if previously reset into the second magnetic state by the word line output pulse, produce no output pulse on an output line coupling the individual negation-cores to separate states of an equality register. However, if a negation-core has not been reset into the second magnetic state by an associated word line output pulse indicating that none of the bit-cores of the associated word line has been switched by the associated bit information pulse and consequently indicating that the stored word is equal to the test word—that clear pulse switches the nonswitched negation-core producing an output pulse on the associated output line coupling said output pulse to the associated stages of the equality register. The negation-core output pulse is gated into the equality register simultaneously with the negation-core clear pulse which gating stores information indicative of the particular word in the array which is equal to the test word. Thus, after a decoding cycle the equality register indicates whether or not an equality, or hit, has been made and the particular word location, or address, of the matched word.

Patent No. 3,015,813 issued January 2, 1962, to W. V.

Tyrlick, discloses an apparatus which performs a comparison of a test word with a plurality of stored words producing an output signal associated with the stored word which is found to be equal to the test word. Applicant's device performs the same function. However, applicant's method of performing the decoding function overcomes several deficiencies inherent in the device disclosed in the above patent. That device, as does the present invention, utilizes a plurality of stored words whose bit order is fixed by the winding sense of windings coupled to the word bit-cores. It utilizes a separate-core for each store word which separate-core is separately magnetically coupled to each of the bit-cores of the stored word. A match of any test word bit with any corresponding stored word bit causes the matched stored word bit-core to switch coupling a driving pulse to the associated stored word separate-core. The switching characteristics of the separate-core is stated to be such that its magnetic state will not be switched by a driving pulse of a magnetomotive force less than that produced by all of the stored word bits-cores switching concurrently. Thus, in any word of N bits it is stated that the separate-core will switch when affected by concurrent driving pulses from the N bit-cores of the stored word, but will not switch when affected by concurrent driving pulses from N-1 bit-cores of the stored word.

An analysis of the above last sentence points out the most serious deficiency of such device. It is well known to those skilled in the art that magnetic cores such as are incorporated in such device must possess substantially rectangular hysteresis characteristics. However, these characteristics vary over a substantially wide range even with the most elaborate manufacturing processes available. Thus, in the computing field where high reliability is essential, it has been the practice to use devices which are substantially non-susceptible to substantial variations in the operating characteristics of the magnetic bistable elements.

In contrast to the above, applicant's novel device is substantially non-susceptible to substantial variations in the operating characteristics of its magnetic bistable elements. As the device of the above patent requires that a separate-core switch when affected by concurrent driving pulses from N bit-cores but does not switch when affected by concurrent driving pulses from N-1 bit-cores it is apparent that the magnetic characteristics of the N bit-cores must be substantially identical and that the magnetic characteristics of the separate-core must have a switching threshold which is precisely defined and stable under all operating conditions. Further, it is apparent that the word length, or number of bits per word, is limited by the operating tolerances of the cores for the word length increases the amplitude-duration characteristic of the individual bit-core generated driving pulse must decrease which provides smaller operating tolerances on the separate-cores' switching threshold. Additionally, as the separate-core must be separately biased to one magnetic state there is an additional power consuming load not realized in applicant's device.

In contrast to the device of the above referenced patent, applicant's novel device incorporates bit-cores and negation-cores which may possess magnetic characteristics of an extremely wide range, is being only essential that the amplitude-duration characteristic of the individual bit-core generated driving pulse produce a magnetic field of sufficient magnetomotive force to switch the associated negation-core.

Accordingly, it is a primary object of this invention to provide an improved decoder device.

Another object of this invention is to provide an apparatus which makes a parallel comparison of a test word to a plurality of stored words and which provides an output signal representative of the stored word which is found to be equal to the test word.

Another object of this invention is to provide an apparatus which makes a parallel comparison of the bits of a test word to the corresponding bits of a prewired stored word which bits on mismatch produce an output pulse on an output line coupled to the bit cores of the stored word.

Another object of this invention is to provide an apparatus which permits the parallel comparison of a test word to a plurality of stored words and which is essentially non-susceptible to variations in the operation characteristics of the magnetic bistable elements.

A further object of this invention is to provide an apparatus which permits the comparison of a test word of N bits to a plurality of stored words of N bits and which switches to one output line out of a maximum of $2^N$ output lines.

A still further object of this invention is to provide an apparatus which permits the switching to one of a possible $2^N$ output lines from an input code of N bits.

These and other more detailed and specific objectives will be disclosed in the course of the following specification, reference being had to the accompanying drawings in which.

Figure 1:
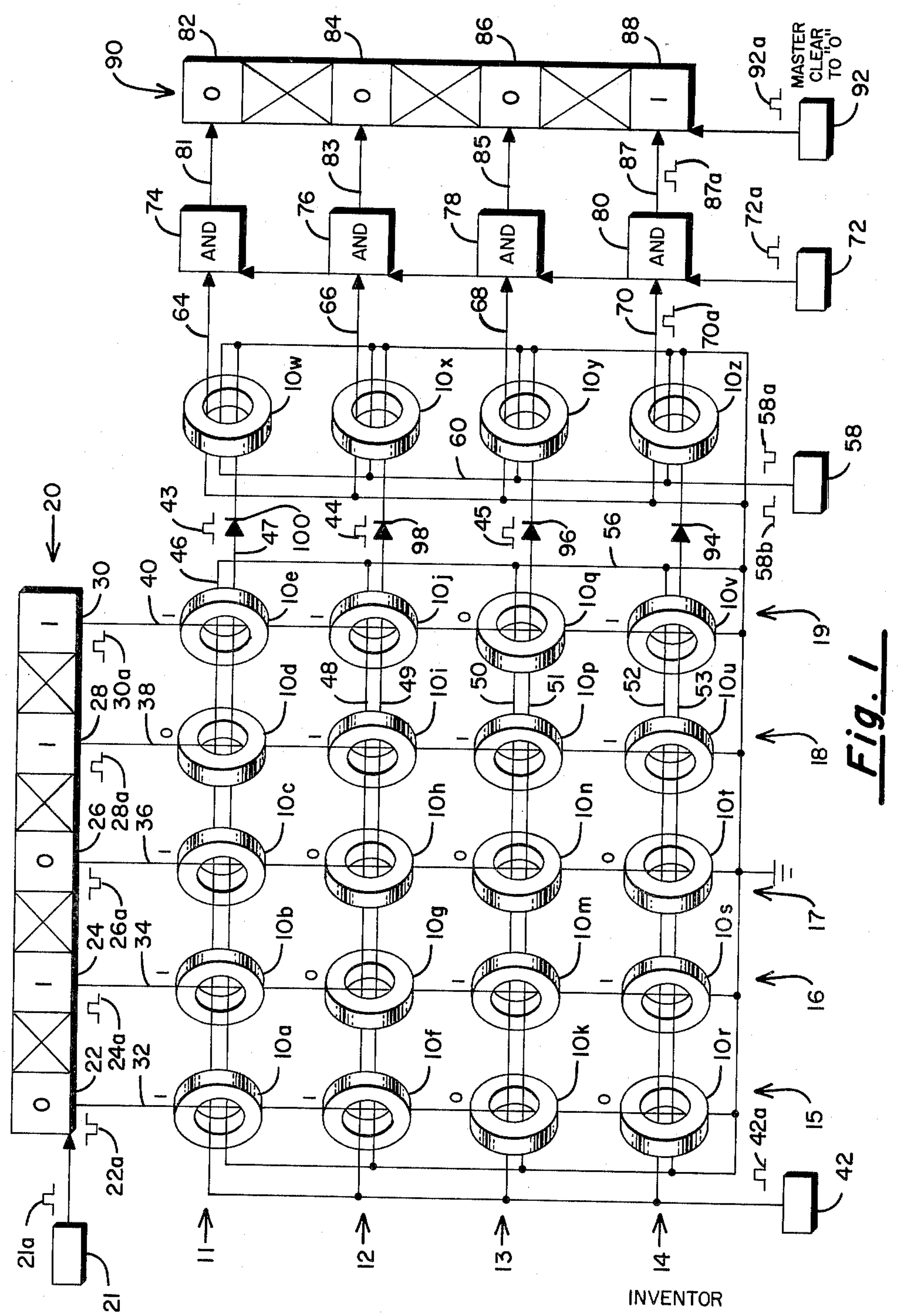
FIG. 1 is a schematic illustration of a preferred embodiment of this invention which uses ferrite toroidal cores as the bistable elements.

The preferred embodiment of FIG. 1 illustrates an embodiment in which a test word 5 bits long is compared in parallel to 4 stored words 5 bits long and which provides an output signal associated with the stored word which is equal to the test word. It is to be appreciated by one of ordinary skill in the art that such device may be expanded such that a test word of N bits in length may be compared to $2^N$ distinct stored words. Thus, it is intended that the embodiment of FIG. 1 is for illustrative purposes only and is not to be construed as a limitation thereto.

The preferred embodiment of FIG. 1 discloses a matrix array of cores 10 arranged in four rows 11, 12, 13 and 14 of five columns 15, 16, 17, 18 and 19 with a bit-core 10 at the intersection of each row and column. The bit-cores of each of columns 15, 16, 17, 18 and 19 represent the bits of the words formed by each row while similarly located bits of each word are in the same column. Input register 20 contains the stored bits of the test word which is to be compared to the stored words of rows 11, 12, 13, and 14. The test word bits which are stored in stages 22, 24, 26, 28, and 30 of register 20, are coupled separately in the same magnetic sense to all the bit-cores of each associated column by column lines 32, 34, 36, 38, and 40.

Input register 20 stores the test word bits as bipolar voltage levels. When gated by input gate pulse 21*a* from source 21, input register 20 couples a positive pulse such as pulse 24*a* which is representative of a stored "1" which sets the associated bit-cores of column 16 into a clockwise first magnetic state and a negative pulse such as pulse 26*a* which is representative of a stored "0" and which sets the associated bit-cores of column 17 into a counterclockwise second magnetic state. Additionally, all the bit-cores of each row are coupled by a separate set of a set line and an output line, i.e., lines 46 and 47 of row 11, lines 48 and 49 of row 12, lines 50 and 51 of row 13, and lines 52 and 53 of row 14, respectively. The magnetic sense of the coupling of the set and output lines of each set to each bit-core are similar and are in such a manner as to set the bit-cores into a clockwise first or counterclockwise second magnetic state, i.e., in moving from left to right along row 11, set line 46 and output line 47 thread down through bit-core 10*a*, 10*b*, 10*c*, and 10*e* and up through bit-core 10*d*. With set pulse 42*a* from source 42 having a positive polarity, bit-cores 10*a*, 10*b*, 10*c* and 10*e* are set in a clockwise first magnetic state indicative of a stored "1," while bit-core 10*d* is set in a counterclockwise second magnetic state indicative of a stored "0." Output lines 47, 49, 51 and 53 in turn couple the output signals, which are induced therein by a switching of an associated bit-core, to negation-cores 10*w*, 10*x*, 10*y* and 10*z*, respectively.

With negation-cores 10*w*, 10*x*, 10*y* and 10*z* having previously been preset to a clockwise first magnetic state by preset pulse 58*a* from source 58, which pulse is coupled to said negation-cores by line 60, an output signal on lines 47, 49, 51 and 53 clears the associated negation-cores to a counterclockwise second magnetic state. The subsequent coupling of clear pulse 58*b* from source 58 to cores 10*w*, 10*x*, 10*y*, and 10*z* by way of line 60 switches those negation-cores not previously switched by the output pulses on lines 47, 49, 51 and 53 to the counterclockwise second magnetic state. This switching of a negation-core induces an output signal in its output line 64, 66, 68 and 70 which, if ANDed by output gate pulse 72*a* from source 72 at AND gates 74, 76, 78 and 80, is coupled by way of lines 81, 83, 85 and 87 to the associated stages 82, 84, 86 and 88 of output register 90. Output register 90 stages are previously master cleared by master clear pulse 92*a* from source 92 to contain all "0"s such that an output signal from a negation-core sets the associated stage to a "1". As only a match of all the bits of the stored word with the test word results in no output signal being impressed upon the associated negation-core, the writing of "1" in output register 90 locates the row, or address, of the stored word, which is equal to the test word held at input register 20.

As the detailed discussion of the operation of FIG. 1 requires reference to signal polarities and magnetic coupling sense, it shall be assumed for purposes of the following discussion that input register 20 contains the bits of test word 01011 in stages 22, 24, 26, 28 and 30, respectively. Further, having the above discussion in mind as regards the magneic coupling sense of set lines 46, 48, 50 and 52, it is apparent that the following words are stored in the associated rows: Row 11, 11101; Row 12, 10011; Row 13, 01010; and Row 14, 01011. Additionally, operation of the embodiment of FIG. 1 shall be assumed to consist of the following cycle of 3 phases:

Phase 1—set pulse 42*a* is coupled to bit-cores 10*a* through 10*v*, setting said bit-cores to the magnetic states as determined by the magnetic sense of the coupling of row set lines 46, 48, 50 and 52. Simultaneously, preset pulse 58*a* is coupled to negation-cores 10*w* through 10*z* setting said negation-cores to a clockwise first magnetic state, and output register 90 is master cleared by master clear pulse 92*a* to contain all "0"s.

Phase 2—input gate pulse 21*a* is coupled to input register 20. This couples pulses 22*a* through 30*a*, which are representative of the information stored in stages 22 through 30, to column lines 32 through 40, respectively. Any bit-core whose magnetic state is switched thereby induces an output signal in the associated row output line which signal switches the associated negation-core to the counterclockwise second magnetic state.

Phase 3—clear pulse 58*b* is coupled to cores 10*w* through 10*z*, switching those negation-cores to the counterclockwise second magnetic state which had not been switched to said state during Phase 2. The switching of a negation-core induces an output signal on an associated output line which, if gated through an associated AND gate, impresses a write "1" signal upon the associated stage of output register 90. The stage which is set to a "1" identifies the row containing the stored word which is equal to the test word contained in input register 20.

At the initiation of Phase 1 set pulse 42*a* sets the magnetic states of bit-cores 10*a* through 10*v* to the magnetic states determined by the magnetic sense of the coupling of row set lines 46, 48, 50, and 52. Simultaneously, preset pulse 58*a* sets the magnetic states of negation-cores 10*w* through 10*z* to a clockwise first magnetic state, and output register 90 is master cleared by master clear pulse 92*a* to contain all "0"s. This procedure is in effect a housekeeping step necessary to assure that all the cores 10*a* through 10*z* are in the proper initial magnetic state prior to the actual comparison of the test word to the stored words. At this time the bit-cores of rows 11, 12, 13, and 14 are set in the proper magnetic states so as to contain the words 11101, 10011, 01010, *and* 01011, respectively.

At the initiation of Phase 2, input gate pulse 21*a* is coupled to input register 20 which couples pulses 22*a*, 24*a*, 26*a*, 28*a*, and 30*a* to column lines 32, 34, 36, 38 and 40, respectively. All bit-cores which are effected by a pulse which sets up a magnetic field which is of an opposite magnetic sense as its set magnetic state is switched thereby generating an output pulse in the associated output line 47, 49, 51, or 53 which output line couples the output pulse to the associated negation-cores 10*w*, 10*x*, 10*y* or 10*z*, respectively. Taking the bit-cores of row 11 as an example, it can be seen that bit-cores 10*a*, 10*b*, 10*c* and 10*e* are set in a clockwise first magnetic state, while bit-core 10*d* is set in a counterclockwise second magnetic state.

Pulse 22*a* sets up a counterclockwise magnetic field in bit-core 10*a* capable of driving its magnetic state into the second magnetic state. As bit-core 10*a* was initially in a first magnetic state, it is switched generating an output pulse in line 47 the magnitude of which is sufficient to set up a magnetic field in negation-core 10*w* capable of driving its magnetic state into the second magnetic state. Further, pulse 28*a* sets up a clockwise magnetic field in bit-core 10*d* capable of driving its magnetic state into the second magnetic state. As bit-core 10*d* was initially in the first magnetic state it also is switched generating an output pulse in line 47. Additionally, pulse 24*a* sets up a counterclockwise magnetic field in bit-core 10*b* capable of driving its magnetic state into the first magnetic state. However, as bit-core 10*b* was initially in the first magnetic state it is not switched and it, therefore, does not generate an output pulse in line 47. Thus, it is apparent that any bit-core 10 which is initially in a magnetic state different than that associated with the information stored in input register 20, is switched generating an output pulse in its associated word output line while any bit-core 10 which is initially in a magnetic state similar to that associated with the information stored in input register 20 is not switched and, therefore, does not generate an output pulse in the associated word output line.

Inspection of rows 11, 12, 13, and 14 indicate that the following bit-cores of the associated rows are in a magnetic state opposite to that associated with the information stored in input register 20: Row 11, bit-cores 10*a*, 10*c*, and 10*d*; Row 12, bit-cores 10*f* and 10*g*; Row 13, bit-core 10*q*. Only row 14 has no bit-core in a magnetic state opposite to that associated with the information stored in input register 20. Consequently, lines 47, 49, and 51 couple output pulses 43, 44, and 45, respectively, to negation-cores 10*w*, 10*x* and 10*y*, respectively, while line 53 couples no output pulse to negation-core 10*z*.

As negation-cores 10*w*, 10*x*, 10*y* and 10*z* have been set into the first clockwise magnetic state by preset pulse 58*a* during Phase 1, the coupling of output pulses 43, 44 and 45 to negation-cores 10*w*, 10*x* and 10*y* by way of output lines 47, 49 and 51, respectively, causes negation-cores 10*w*, 10*x* and 10*y* to be reset into the counterclockwise second magnetic state while negation-core 10*z* remains in the clockwise first magnetic state. At the initiation of Phase 3, clear pulse 58*b* is coupled to negation-cores 10w, 10x, 10y and 10z by way of line 60. Clear pulse 58b sets up the counterclockwise magnetic field in negation-cores 10w, 10x, 10y and 10z which is capable of driving their magnetic states into the counterclockwise second magnetic state. As negation-cores 10w, 10x, and 10y had been previously set into the counterclockwise second magnetic state by reset pulses 43, 44, and 45, respectively, the magnetic states of these negation-cores are unaffected by this counterclockwise magnetic field. However, negation-core 10z, its magnetic state not having been set into the counterclockwise second magnetic state by a reset pulse on line 53, is switched into the counterclockwise second magnetic state by the counterclockwise magnetic field generated by pulse 58b. The switching of the magnetic state of negation-core 10z generates an output pulse 70a on line 70, which, if ANDed at AND gate 80 by output gate pulse 72a couples pulse 87a to stage 88 of output register 90 by way of line 87. Stage 88 of output register 90 is thereby set to contain a "1" indicating that word line 14 contains a stored word equal to the test word held in input register 20.

In instances wherein there is insufficient line impedance to provide isolation of the negation-core output with respect to word output lines 47, 49, 51 and 53 during the clear operation of pulse 58b it may be advantageous to insert an impedance means in the word lines between the negation-core and the bit-cores. For this purpose diodes 94, 96, 98 and 100 may be utilized. However, most embodiments have sufficient built-in line resistance and inductance so as to obviate the need for such additional devices.

Figures 2, 3:
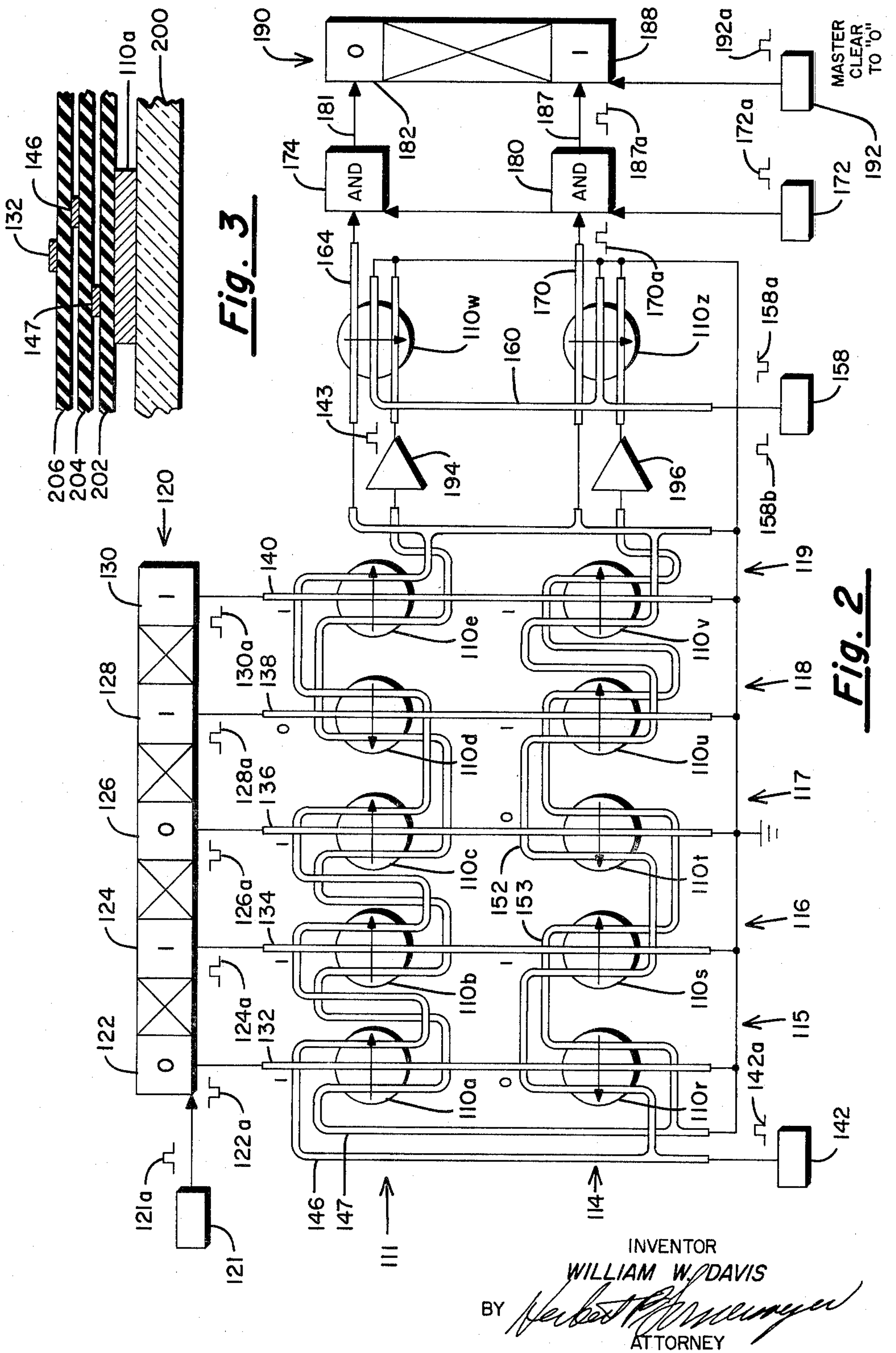
FIG. 2 is a schematic illustration of a preferred embodiment of this invention which uses thin ferromagnetic films having an easy axis of magnetization as the bistable elements.
FIG. 3 is a schematic illustration of a cross sectional view taken across a thin ferromagnetic film of FIG. 2 illustrating the stacked relationship of the film and its coupling conductors.

The preferred embodiment of FIG. 2 illustrates an embodiment in which a test word 5 bits long is compared in parallel to two stored words 5 bits long and which provides an output signal associated with the stored word which is equal to the test word. As with the illustrated embodiment of FIG. 1, it is to be appreciated by one of ordinary skill in the art that such device may be expanded such that a test word of N bits in length may be compared to $2^N$ distinct stored words. The embodiment of FIG. 2 is included herein to disclose a variation of the embodiment of FIG. 1 which utilizes thin ferromagnetic films having an easy axis of magnetization as the bistable elements and in which the associated conductors are of the printed circuit type. The term "printed circuit" when used herein, shall mean an electrically conductive material disposed in accordance with a predetermined pattern upon an electrically insulating base material.

The preferred embodiment of FIG. 2 discloses a matrix array of thin ferromagnetic film cores 110 arranged in two rows 111 and 114 of five columns 115, 116, 117, 118 and 119, with a core 110 at the intersection of each row and column. The bit-cores of each of columns 115 through 119 represent the bits of the words formed by each row while similarly located bits of each word are in the same column. Input register 120 contains the stored bits of a test word which is to be compared to the stored words of rows 111 and 114. The test word bits which are stored in stages 122, 124, 126, 128 and 130, of register 120 are coupled separately in the same magnetic sense to all the bit-cores of each associated column by printed circuit column lines 132, 134, 136, 138 and 140. The easy axes of bit-cores 110 are illustrated as being oriented in a horizontal relationship with the coupled printed circuit conductors at a transverse relationship therewith so as to provide drive fields along each bit-core's easy axis. Thus, by coupling bipolar current signals to the printed circuit conductors, longitudinal drive fields are produced which set the magnetic states of bit-cores 110 into a left-wise magnetic state indicative of a stored "0" or into a right-wise magnetic state indicative of a stored "1."

Input register 120 stores the test word bits as bipolar voltage levels. When gated by input gate pulse 121a from source 121, input register 120 couples a positive pulse such as pulse 124a which is representative of a stored "1" which sets the associated bit-cores of column 116 into a right-wise magnetic state or a negative pulse such as 126a which is representative of a stored "0" and which sets the associated bit-cores of column 117 into a left-wise magnetic state. Additionally, all the bit-cores of each row are coupled by a separate set of a set line and an output line, i.e., lines 146 and 147 of row 111, and lines 152 and 153 of row 114, respectively. The magnetic sense of the coupling of the set line and the output line of each set to each bit-core are similar and are in such a manner as to set the bit-cores into a left-wise or right-wise magnetic state, i.e., in moving from left to right along row 111 set line 146 and output line 147 thread down over bit-cores 110a, 110b, 110c and 110e and up over bit-core 110d. With set pulse 142a from source 142 having a positive polarity, bit-cores 110a, 110b, 110c and 110e are set into a right-wise magnetic state indicative of a stored "1" while bit-core 110d is set into a left-wise magnetic state indicative of a stored "0." Output lines 147 and 153, in turn, couple the output signals, which are induced therein by switching of an associated bit-core, to negation-core 110w and 110z, respectively.

With negation-cores 110w and 110z having previously been preset to a downward magnetic state by preset pulse 158a from source 158 which pulse is coupled to said negation-cores by line 160, an output signal on lines 147 or 153 clears the associated negation-cores to an upward magnetic state. The subsequent coupling of clear pulse 158b from source 158 to cores 110w and 110z by way of line 160, switches those negation-cores not previously switched by the output pulses on lines 147 and 157 to the upward magnetic state. This switching of a negation-core by pulse 158b induces an output signal in its output line 164 or 170 which, if ANDed by output gate pulse 172a from source 172 at AND gates 174 and 180, is coupled by way of lines 181 and 187 to the associated stages 182 and 188 of output register 190. Output register 190 stages are previously master clear by master clear pulse 192a from source 192 to contain all "0's" such that an output signal from a negation-core sets the associated stage to a "1." As only a match of all of the bits of the stored word with the test word results in no output signal being impressed upon the associated negation-core, the writing of a "1" in output register 190 locates the row, or address, of the stored word, which is equal to the test word held in input register 120.

As with the detailed discussion of the operation of FIG. 1, the detailed discussion of operation of FIG. 2 requires reference to signal polarities in magnetic coupling sense and, therefore, it shall be assumed for purposes of the following discussion, that input register 120 contains the bits of the test word 01011 in stages 122, 124, 126, 128, and 130, respectively. Further, having the above discussion in mind as regards the magnetic coupling sense of output lines 147 and 153, it is apparent that the following words are stored in associated rows: Row 111, 11101; Row 114, 01011; additionally, as with the operation of the embodiment of FIG. 1, operation of the embodiment of FIG. 2 shall assume to consist of the following cycle of three phases:

Phase 1—set pulse 142a is coupled to bit-cores 110a through 110v, setting said bit-cores to the magnetic states as determined by the magnetic sense of the coupling of row set lines 146 and 152. Simulaneously, preset pulse 158a is coupled to negation-cores 110w and 110z setting said negation-cores to a downward magnetic state, and output register 190 is master cleared by master clear pulse 192a to contain all "0"s.

Phase 2—input gate pulse 121a is coupled to input register 120. This couples pulses 122a through 130a, which are representative of the information stored in stages 122 through 130, to column lines 132 through 140, respectively. Any bit-core whose magnetic state is switched thereby induces an output signal in the associated row output line which signal switches the associated negation-core to the upward magnetic state.

Phase 3—clear pulse **158*b* is coupled to cores 110*w* and 110*z* switching those negation-cores to the upward magnetic state which have not been switched to said state during Phase 2. The switching of a negation-core induces an output signal on an associated output line which, if gated through an associated AND gate, impresses a write "1" signal upon the associated stage of output register 190. The stage which is set to a "1" identifies the row containing the stored word which is equal to the test word contained in input register 120**.

At the initiation of Phase 1, set pulse **142*a* sets the magnetic states of bit-cores 110*a* through 110*v* to the magnetic states determined by the magnetic sense of the coupling of row set lines 146 and 152. Simultaneously, preset pulse 158*a* sets the magnetic states of negation-cores 110*w* and 110*z* to a downward magnetic state, and output register 190 is master cleared by master clear pulse 192*a* to contain all "0"s. This procedure is in effect a housekeeping step necessary to assure that all the cores 110*a* through 110*z* are in the proper initial magnetic state prior to the actual comparison of the test word to the stored words. At this time, the bit-cores of rows 111 and 114** are set in the proper magnetic states so as to contain the words 11101 and 01011, respectively.

At the initiation of Phase 2, input gate pulse **121*a* is coupled to input register 120 which couples pulses 122*a*, 124*a*, 126*a*, 128*a*, and 130*a* to column lines 132, 134, 136, 138 and 140, respectively. All bit-cores which are affected by a pulse which sets up a magnetic field which is of an opposite magnetic sense as its set magnetic state is switched thereby generating an output pulse in the associated output line 147 or 153 which output line couples the output pulse to the associated negation-cores 110*w* or 110*z*, respectively. Taking the bit-cores of row 111 as an example, it can be seen that bit cores 110*a*, 110*b*, 110*c*, and 110*e* are set in a right-wise magnetic state, while bit-core 110*d*** is set in a left-wise magnetic state.

Pulse **122*a* sets up a left-wise magnetic field in bit-core 110*a* capable of driving its magnetic state into the left-wise magnetic state. As bit-core 110*a* was initially in a right-wise magnetic state, it is switched generating an output pulse in line 147 the magnitude of which is sufficient to set up a magnetic field in negation-core 110*w* capable of driving its magnetic state into the upward magnetic state. Further, pulse 128*a* sets up a right-wise magnetic field in bit-core 110*d* capable of driving its magnetic state into the right-wise magnetic state. As bit-core 110*d* was initially in the left-wise magnetic state, it also is switched generating an output pulse in line 147. Additionally, pulse 124*a* sets up a right-wise magnetic field in bit-core 110*b* capable of driving its magnetic state into the right-wise magnetic state. However, as bit-core 110*b* was initially in the right-wise magnetic state, it is not switched and, therefore, does not generate an output pulse in line 147. Thus, it is apparent that any bit-core 110 which is initially in a magnetic state different than that associated with the information stored in input register 120 is switched generating an output pulse in its associated word output line while any bit-core 110 which is initially in a magnetic state similar to that associated with the information stored in input register 120**, is not switched, and, therefore, does not generate an output pulse in its associated word output line.

Inspection of rows 111 and 114 indicates that the following bit-cores of the associated rows are in a magnetic state opposite to that associated with the information stored in the input register 120: Row 111, bit-cores **110*a*, 110c, and 110*d*; Row 114 has no bit-core in a magnetic state opposite to that associated with the information stored in input register 120. Consequently, line 147 couples output pulse 143 to negation-core 110*w* while output line 153 couples no output pulse to negation-core 110*z***.

As negation-cores **110*w* and 110*z* have been set into the downward magnetic state by preset pulse 158*a* during Phase 1, the coupling of output pulse 143 to core 110*w* by way of output line 147 causes negation-core 110*w* to be reset into the upward magnetic state while negation-core 110*z* remains in the downward magnetic state. At the initiation of Phase 3, clear pulse 158*b* is coupled to negation-cores 110*w* and 110*z* by way of line 160. Clear pulse 158*b* sets up the upward magnetic field in negation-cores 110*w* and 110*z* which is capable of driving their magnetic states into the upward magnetic state. As negation-core 110*w* had been previously set into the upward magnetic state by reset pulse 143, the magnetic state of this negation-core is unaffected by this upward magnetic field. However, negation-core 110*z* its magnetic state not having been set into the upward magnetic state by a reset pulse on line 153, is switched into the upward magnetic state by the upward magnetic field generated by pulse 158*b*. Switching of the magnetic state of negation-core 110*z* generates an output pulse 170*a* on line 170 which, if ANDed at AND gate 180 by output gate pulse 172*a* couples pulse 187*a* to stage 188 of output register 190 by way of line 187. Stage 188 of output register 190 is thereby set to contain "1" indicating that word line 114 contains a stored word equal to the test word held input register 120**.

In instances wherein there is insufficient output power in the bit-core output signal, such as pulse 143, to switch the negation-cores it may be advantageous to insert an amplifier such as amplifying means 194 and 196, in the row output line. This should assure reliable operation of the embodiment of FIG. 2 under the most marginal of operating conditions.

It is to be appreciated that the illustrated embodiment of FIG. 2 is only presented to illustrate the overall arrangement of thin ferromagnetic film cores and coupling conductors with no intent to include the necessary supporting and insulating layers. FIG. 3 presents a diagrammatic illustration of the stacked relationship of a film core with a plurality of printed circuit conductors including the necessary supporting and insulating layers. In this illustration, film core **110*a* is disposed upon glass substrate 200 with lines 147, 146 and 132 disposed upon insulators 202, 204 and 206**, respectively. A typical core plane assembly may include fabrication of the printed circuit conductors from a 0.0025 inch thick sheet of polyethylene terephthalate copper coated with a 0.00013 thick layer of copper wherein predetermined portions of the copper is etched away leaving the printed circuit conductors and wherein a 2000 Angstrom thick thin ferromagnetic film is vacuum deposited upon a 0.006 thick glass substrate as disclosed in the aforementioned Rubens Patent No. 2,900,282. The separate elements are then assembled into a single unitary core stack by coating the elements with an adhesive material and pressing the elements together. In view of the above remarks it is to be understood that the illustration of FIG. 3 is not intended to represent actual or comparative dimensions or sizes but is presented to better understand the illustrated embodiment of FIG. 2.

Thus, it is apparent that the illustrated embodiments of applicant's invention have achieved the parallel search of a plurality of stored words for an equality to a test word, and it has produced an output indicative of the found stored word.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

What is claimed is:

1. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; separate output means associated with each of said negation elements; first means setting the memory elements of each row into the magnetic state representative of the bits of the stored words; second means setting the magnetic state of said negation elements into a first clear state; third means setting said memory elements of each column into the magnetic state representative of the column associated bits of the test word; the opposite magnetic effect of said first and third means at each memory element generating an output signal which switches the magnetic state of said row associated negation element from said clear state to an opposite set state; forth means switching the magnetic state of said negation elements which had not been switched by said memory element output signal into said state thereby generating an output signal in said negation element output means indicating that the word stored in the associated row is equal to the test word.

2. The apparatus of claim 1 wherein said memory elements are thin ferromagnetic films and said memory element column, set, and output conductors are of the printed circuit type.

3. The apparatus of claim 2 wherein said films have a preferred or easy axis of magnetization and said axis is oriented at an angle with the physical axis of the associated conductors.

4. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; an input register having a plurality of stages for holding binary information representative of the bits of test word; an output register for holding the binary information representative of the comparison of the test word to the plurality of the stored words; first means setting said memory elements of each column into the magnetic state representative of the column associated bits of the test word; second means setting the magnetic state of said negation elements into a first clear state; third means setting the memory elements of each row into the magnetic state representative of the bits of the stored word; the opposite magnetic effect of said first and third means at each memory element generating an output signal which switches the magnetic state of said row associated negation element from said clear state to an opposite set state; fourth means switching the magnetic state of said negation elements which had not been switched by said memory element output signal into said set state thereby generating an output signal setting the output register row associated stage into the binary state indicating that the word stored in the associated row is equal to the test word.

5. The apparatus of claim 4 wherein said memory elements are thin ferromagnetic films and said memory element column, set, and output conductors are of the printed circuit type.

6. The apparatus of claim 5 wherein said films have a preferred or easy axis of magnetization and said axis is oriented at an angle with the physical axis of the associated conductors.

7. The apparatus of claim 6 wherein each of said output conductors coupling said rows of memory elements with said negation elements further includes an amplifying means between said memory elements and the associated negation element.

8. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; separate output means associated with each of said negation elements; first means setting said memory elements of each column into the magnetic state representative of the column associated bits of the test word; second means setting the magnetic state of said negation elements into a first clear state; third means setting the memory elements of each row into the magnetic state representative of the bits of he stored word; the opposite magnetic effect of said first and third means at each memory element generating an output signal which switches the magnetic state of said row associated negation element from said clear state to an opposite set state; fourth means switching the magnetic state of said negation elements which had not been switched by said memory element output signal into said set state thereby generating an output signal in said negation element output means indicating that the word stored in the associated row is equal to the test word.

9. The apparatus of claim 8 wherein said memory elements are thin ferromagnetic films and said memory element column, set, and output conductors are of the printed circuit type.

10. The apparatus of claim 9 wherein said films have a preferred or easy axis of magnetization and said axis is oriented at an angle with the physical axis of the associated conductors.

11. The apparatus of claim 10 wherein each of said output conductors coupling said rows of memory elements with said negation elements further includes an amplifying means between said memory elements and the associated negation element.

12. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; and input register having a plurality of stages for holding binary information representative of the bits of the test word; an output register for holding the binary information representative of the comparison of the test word to the plurality of the stored words; first means setting the memory elements of each row into the magnetic state representative of the bits of the stored word; second means setting the magnetic state of said negation elements into a first clear state; third means setting said memory elements of each column into the magnetic state representative of the column associated bits of the test word; the opposie magnetic effect of said first and third means at each memory element generating an output signal which switches the magnetic state of said row associated negation element from said clear state to an opposite set state; fourth means switching the magnetic state of said negation elements which had not been switched by said memory element output signal into said set state thereby generating an output signal setting the output register row associated stage into the binary state indicating that the word stored in the associated row is equal to the test word.

13. The apparatus of claim 12 wherein said memory elements are thin ferromagnetic films and said memory element column, set, and output conductors are of the printed circuit type.

14. The apparatus of claim 13 wherein said films have a preferred or easy axis of magnetization and said axis is oriented at an angle with the physical axis of the associted conductors.

15. The apparatus of claim 14 wherein each of said output conductors coupling said rows of memory elements with said negation elements further includes an amplifying means between said memory elements and the associated negation element.

16. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; a separate column conductor coupling all the memory elements of each column in a first magnetic sense; separate pairs of a set conductor and an output conductor coupling all the memory elements of each row in a first or second magnetic sense representative of the binary information stored in each memory element of said row, each of said memory element output conductors additionally coupled to the row associated negation element; a separate output conductor coupling each row associated negation element; a set line coupling all of the negation cores; first signal generating means coupling to all the set conductors of said rows of memory elements a set pulse setting all the memory elements in a first or second magnetic sense as determined by the magnetic coupling sense of said set conductors with said memory elements; second signal generating means coupling to said negation element set line a set pulse setting said negation cores into a set magnetic state; third signal generating means coupling bipolar voltage levels representative of the bits of the test word to the associated column conductors, said voltage levels setting up magnetic fields in the areas of the memory elements such that if the magnetic state of the coupled memory element is in the same magnetic sense its magnetic state is not effected but if in the opposite magnetic sense, its magnetic state is switched generating thereby an output signal in the associated row output line, said memory element output signal switching the magnetic state of the coupled negation core to a clear magnetic state opposite to a set magnetic state achieved by said negation core set pulse; fourth signal generating means coupling a clear pulse to said negation element set line switching those negation elements into the clear state which had not been previously set into the clear state by said memory element output signal, the switching of said negation elements generating an output signal on their associated output line, thus identifying a row of memory elements containing the stored word which is equal to the test word.

17. The apparatus of claim 16 wherein said memory elements are thin ferromagnetic films and said memory element column, set, and output conductors are of the printed circuit type.

18. The apparatus of claim 17 wherein said films have a preferred or easy axis of magnetization and said axis is oriented at an angle with the physical axis of the associated conductors.

19. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; an input register having a plurality of bistable stages for holding the binary information representative of the bits of the test word; a separate column conductor coupling each stage of said input register separately to the memory elements of each column in a first magnetic sense; separate pairs of a set conductor and an output conductor coupling all the memory elements of each row in a first or second magnetic sense representative of the binary information stored in each memory element of said row, each of said memory element output conductors additionally coupled to the row associated negation element; an output register having a plurality of bistable stages for holding the binary information representative of the comparison of the test word to the plurality of stored words; a separate output conductor coupling each stage of said output register to a separate row associated negation element by way of an AND gate; a set line coupling all of the negation cores; first signal generating means coupling to said input register a gate pulse coupling bipolar voltage levels representative of the bits of the test word stored in said input register to the associated column conductors setting said memory elements into a first or second magnetic state; second signal generating means coupling to said negation element set line a set pulse setting said negation cores into a set magnetic state; third signal generating means coupling to all the set conductors of said rows of memory elements a set pulse, said set pulse setting up magnetic fields in the areas of the memory elements such that if the magnetic state of the coupled memory element is in the same magnetic sense its magnetic state is not affected but if in the other magnetic sense, its magnetic state is switched generating thereby an output signal in the associated row output line, said memory element output signal switching the magnetic state of the coupled negation core to a clear magnetic state opposite to a set magnetic state achieved by said negation core set pulse; fourth signal generating means coupling a clear pulse to said negation element set line switching those negation elements into the clear state which had not been previously set into the clear state by said memory element output signal, the switching of said negation elements generating an output signal generating on their associated output line; fifth signal means coupling to said negation element AND gates a gating pulse coupling said negation element output signal to the associated output register stage setting said stage to store a "1" thus identifying a row of memory elements containing the stored word which is equal to the test word.

20. The apparatus of claim 19 wherein said memory elements are thin ferromagnetic films and said memory element column, set, and output conductors are of the printed circuit type.

21. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; a separate column conductor coupling all the memory elements of each column in a first magnetic sense; separate pairs of a set conductor and an output conductor coupling all the memory elements of each row in a first or second magnetic sense representative of the binary information stored in each memory element of said row, each of said memory element output conductors additionally coupled to the row associated negation element; a separate output conductor coupling each associated negation element; a set line coupling all of the negation cores; first signal generating means coupling bipolar voltage levels representative of the bits of the test word to the associated column conductors setting said memory elements into a first or second magnetic state; second signal generating means coupling to said negation element set line a set pulse setting said negation cores into a set magnetic state; third signal generating means coupling to all the set conductors of said rows of memory elements a set pulse said set pulse setting up magnetic fields in the areas of the memory elements such that if the magnetic state of the coupled memory element is in the same magnetic sense its magnetic state is not effected but if in the opposite magnetic sense, its magnetic state is switched generating thereby an output signal in the associated row output line, said memory element output signal switching the magnetic state of the coupled negation core to a clear magnetic state opposite to a set magnetic state achieved by said negation core set pulse; fourth signal generating means coupling a clear pulse to said negation element set line switching those negation elements into the clear state which had not been previously set into the clear state by said memory element output signal, the switching of said negation elements generating an output signal on their associated output line thus identifying a row of memory elements containing the stored word which is equal to the test word.

22. The apparatus of claim 21 wherein said memory elements are thin ferromagnetic films and said memory element column, set, and output conductors are of the printed circuit type.

23. Signal responsive apparatus for the parallel comparison of a multi-bit test word to a plurality of multi-bit stored words comprising: a plurality of bistable magnetic memory elements arranged in a matrix array of rows and columns with a memory element at the intersection of each row and column; an additional column of bistable magnetic negation elements having one negation element associated with each of said rows; an input register having a plurality of bistable stages for holding the binary information representative of the bits of the test word; a separate column conductor coupling each stage of said input register separately to the memory elements of each column in a first magnetic sense; separate pairs of a set conductor and an output conductor each serially coupling all the memory elements of each row in a first or second magnetic sense representative of the binary information stored in each memory element of said row, each of said memory element output conductors additionally coupled to the row associated negation element; an output register having a plurality of bistable stages for holding the binary information representative of the comparison of the test word to the plurality of stored words; a separate output conductor coupling each stage of said output register to a separate row associated negation element by way of an AND gate; a set line serially coupling all of the negation cores; first signal generating means coupling to all the set conductors of said rows of memory elements a set pulse setting all the memory elements in a first or second magnetic sense as determined by the magnetic coupling sense of said set conductors with said memory elements; second signal generating means coupling to said negation element set line a set pulse setting said negation cores into a set magnetic state; third signal generating means coupling to said input register a gate pulse coupling bipolar voltage levels representative of the bits of the test word stored in said input register to the associated column conductors, said voltage levels setting up magnetic fields in the areas of the memory elements such that if the magnetic state of the coupled memory element is in the same magnetic sense its magnetic state is not effected but if in the opposite magnetic sense, its magnetic state is switched generating thereby an output signal in the associated row output line, said memory element output signal switching the magnetic state of the coupled negation core to a clear magnetic state opposite to the set magnetic state achieved by said negation core set pulse; fourth signal generating means coupling a clear pulse to said negation element set line switching those negation elements into the clear state which had not been previously set into the clear state by said memory element output signal, the switching of said negation elements generating an output signal on their associated output line; fifth signal generating means coupling to said negation element AND gates a gating pulse coupling said negation element output signal to the associated output register stage setting said stage to store a "1" thus identifying a row of memory elements containing the stored word which is equal to the test word.

24. The apparatus of claim 23 wherein said memory elements are thin ferromagnetic films and said memory element column, set, and output conductors are of the printed circuit type.

25. The apparatus of claim 24 wherein said films have a preferred or easy axis of magnetization and said axis is oriented at an angle with the physical axis of the associated conductors.

26. The apparatus of claim 23 wherein each of said output conductors coupling said rows of memory elements with said negation elements further includes an impedance device between said memory elements and the associated negation elements.

27. The apparatus of claim 26 wherein said impedance device is a diode.

References Cited by the Examiner

UNITED STATES PATENTS

| | | | |
|---|---|---|---|
| 2,896,193 | 7/1959 | Hermann | 340—166 |
| 2,995,303 | 8/1961 | Collins | 340—166 |
| 3,008,128 | 11/1961 | Powell | 340—174 |
| 3,008,129 | 11/1961 | Katz | 340—146.2 |
| 3,047,843 | 7/1962 | Katz et al. | 340—146.2 |

FOREIGN PATENTS

| | | |
|---|---|---|
| 845,604 | 8/1960 | Great Britain |

ROBERT C. BAILEY, *Primary Examiner.*

MALCOLM A. MORRISON, *Examiner.*

UNITED STATES PATENT OFFICE

CERTIFICATE OF CORRECTION

Patent No. 3,222,645 December 7, 1965

William W. Davis

It is hereby certified that error appears in the above numbered patent requiring correction and that the said Letters Patent should read as corrected below.

Column 2, line 2, for "Flms" read -- Films --; column 12, line 49, for "opposie" read -- opposite --; column 14, line 26, strike out "generating"; line 27, for "signal means" read -- signal generating means --.

Signed and sealed this 6th day of December 1966.

(SEAL)
Attest:

ERNEST W. SWIDER
Attesting Officer

EDWARD J. BRENNER
Commissioner of Patents